United States Patent [19]
Zink

[11] Patent Number: 4,532,377
[45] Date of Patent: Jul. 30, 1985

[54] DATA CALL TRANSFER

[75] Inventor: John H. Zink, Manalapan, N.J.

[73] Assignee: AT&T Information Systems Inc., Holmdel, N.J.

[21] Appl. No.: 514,519

[22] Filed: Jul. 18, 1983

[51] Int. Cl.³ ............................................. H04M 11/00
[52] U.S. Cl. .................................................. 179/2 DP
[58] Field of Search .................. 179/2 DP, 2 R, 2 A, 179/18 BD, 18 C, 99 M; 370/42, 53

[56] References Cited

U.S. PATENT DOCUMENTS 3,922,497 11/1975 Artom et al.
4,112,258 9/1978 Alles.
4,291,200 9/1981 Smith .............................. 179/18 BD
4,330,886 5/1982 Fukuda et al. ............... 179/2 DP X
4,479,195 10/1984 Herr et al.

OTHER PUBLICATIONS

Accarino et al., "Frame-Mode Customer Access to Local Integrated Voice and Data Digital Networks", Report: 1979 *IEEE International Conference on Communications*, pp. 38.5.1–38.5.7.

Primary Examiner—Keith E. George
Attorney, Agent, or Firm—James M. Graziano

[57] ABSTRACT

This data call transfer arrangement enables a calling party to originate a data call from a telephone station set and then transfer the data call to one of a number of predefined digital terminals. This is accomplished by operating the DATA button on the telephone station set corresponding to the selected digital terminal once the data call is established. This action causes the subject telephone switching system to replace the telephone station set on the call appearance with the selected digital terminal.

18 Claims, 8 Drawing Figures

DATA CALL TRANSFER

CROSS-REFERENCE TO RELATED APPLICATIONS

This application is related to the following concurrently filed applications:

G. N. Squicciarini 1, Ser. No. 514,882, entitled "Digital Terminal Keyboard Dialing";

and J. H. Zink 2, Ser. No. 514,518, entitled "Data Call Transfer Preindication".

FIELD OF THE INVENTION

This invention relates to telephone switching systems and, in particular, to an arrangement for transferring a data call from a telephone station set connected to one communication pair to a digital terminal connected to another communication pair. This data call transfer is effected by the calling party operating a single DATA button on the telephone station set.

BACKGROUND OF THE INVENTION

Digital terminals are connected to telephone switching systems by either special digital port circuits or modems which interface the digital terminal to any standard analog port circuit. In either case, a standard telephone station set is required to originate a data call for the digital terminal. This telephone station set is bridged on to the communication pair serving the digital terminal and is used to originate a data call by implementing the off-hook and digit dialing functions. Once the data call has been originated in this fashion, the telephone station set is returned to the on-hook condition and remains unused for the remainder of the data call.

Thus, each user of a digital terminal is generally provided with two communication pairs: one equipped with a telephone station set—used for voice calls; one equipped with a telephone station set and a digital terminal—used for data calls. It is apparent that such an arrangement is an inefficient use of equipment.

SUMMARY OF THE INVENTION

The data call transfer arrangement of this invention overcomes this problem by enabling a user at a standard telephone station set to originate a data call and then transfer the data call to any one of a number of predefined digital terminals. The originating telephone station set and its associated communication pair are thereby made available for other calls. A subscriber originates a data call from a telephone station set in conventional fashion by dialing the number of the called station. The subscriber transfers this data call to a selected digital terminal by simply depressing the DATA key on the telephone station set which key is associated with the selected digital terminal. The telephone station set generates a control message indicating the DATA key operation.

The subject telephone switching system has a control signalling channel between the digital terminals connected to the telephone switching system and the system processor. Therefore, the telephone station set transmits the control message indicating the DATA key operation to the system processor via the control signalling channel. The system processor decodes the received control message and activates the switching network, which transfers the data call from the originating telephone station set to the selected digital terminal.

Thus, the communication pair serving a digital terminal need not be equipped with a telephone station set since a data call can be transferred to the digital terminal from a telephone station set.

DETAILED DESCRIPTION

Figures 1, 8:
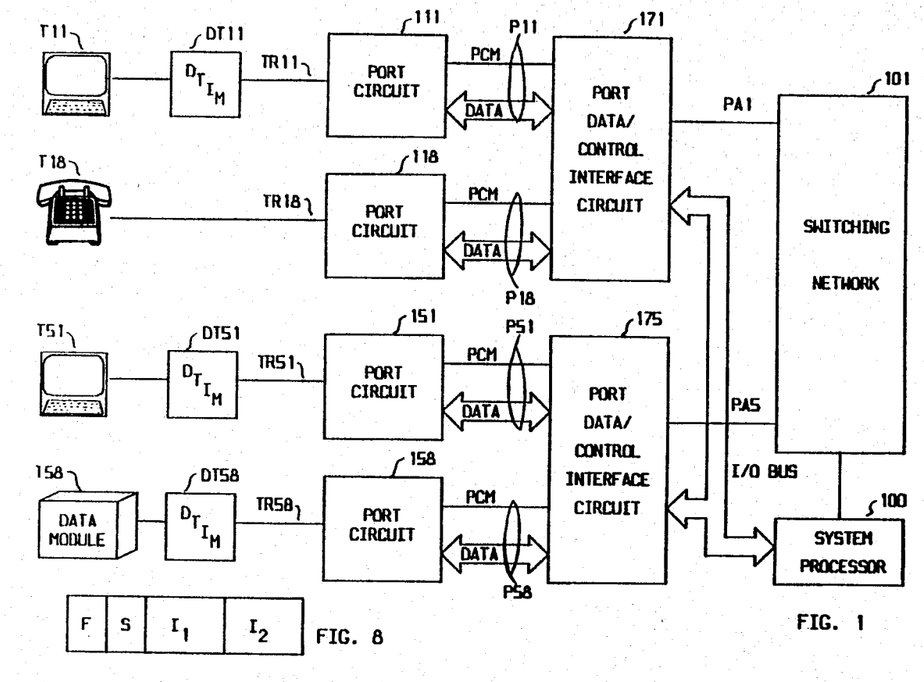
FIG. 1 illustrates the subject telephone switching system.
FIG. 8 illustrates the data transmission format used between digital terminals and port circuits.

The subject telephone switching system is illustrated in FIG. 1. This system is described in detail in copending application Ser. No. 417,504, filed Sept. 13, 1982 by J. A. Lucas. This system includes a plurality of communications circuits T11–T58 each of which is associated with a respective one of port circuits 111–158. These communications circuits may include digital telephone station sets (T18) as well as digital terminal (T11) which are equipped with a keyboard and a CRT. A port circuit (such as 118 of FIG. 1) interfaces between alternate bipolar modulated code messages used by communications circuits T11–T58 and either pulse code modulated (PCM) data or PCM-encoded voice signals transmitted by switching network 101 between the calling and called stations. Port circuit 118 forwards control messages between system processor 100 via port data/control interface circuit 171 and telephone station set T18.

Switching network 101 comprises a time slot interchange circuit of the type illustrated in U.S. Pat. No. 4,112,258. Switching network 101 is connected to a number of port data/control interface circuits 171–175, each of which serves as a multiplexor for a plurality of port circuits 111–158 and their associated communications circuits (T11–T58). Thus, switching network 101 establishes communication connections among port circuits 111–158 via the associated port data/control interface circuits 171–175.

This switching system is equipped with a control signalling channel (S channel) which conveys control messages between system processor 100 and communications circuits T11–T58. The S channel extends from each communication circuit (such as T18) through associated communication leads TR18, port circuit 118, leads P18 and then through port data/control interface circuit 171 to system processor 100 via I/O BUS. The switching system is also equipped with an information channel (I channel) which conveys information data such as PCM-encoded voice signals or bulk data between switching network 101 and communications circuits T11–T58. The I channel extends from each communications circuit (such as T18) through communication leads TR18, port circuit 118, leads P18 and then through port data/control interface circuit 171 to switching network 101 via leads PA1.

I Channel Realization

System processor 100, in the course of connecting calling station set T18 to a called digital terminal such as data module (computer port) T58, assigns a time slot in switching network 101 for the interconnection of station set T18 and T58. Switching network 101 controls the data or I channel transmissions from communications circuits T11-T58. In particular, switching network 101 periodically transmits a message frame to port circuit 118 via port data/control interface circuit 171. Port circuit 118 transmits the message frame to digital telephone station set T18 and also receives a reply message frame from digital telephone station set T18 for transmission to data module T58. Port circuit 118 transmits the message frame received from digital telephone station set T18 to switching network 101 via port data/control interface circuit 171. Switching network 101 stores the received message frame, and interchanges the message frames received from digital telephone station set T18 and data module T58 during the time slot assigned for this call. This action interconnects these digital terminals.

S Channel Realization

The control or S channel transmissions are controlled by system processor 100. System processor 100 periodically scans each port, trunk and service circuit connected to switching network 101 to find if there is a control message for system processor 100. During each such scan cycle, system processor 100 transmits timing, address and control information to port data/control interface circuits 171-175 via I/O BUS. Each port data/control interface circuit (ex. 171) is a multiplexer which interprets the signals received on I/O BUS during each scan cycle and determines whether the address signals transmitted thereon identify one of the port circuits (e.g. 118) served by that port data/control interface circuit (171). If such a match occurs during a scan cycle, port data/control interface circuit 171 enables the identified port circuit 118 to read the control message transmitted to port data/control interface circuit 171 by system processor 100.

Port circuit 118 reads the control message written into port/data control interface circuit 171 by system processor 100 and places the control message into a control message register (not shown) in port circuit 118. Port circuit 118 transmits this control message one bit at a time from the control message register to digital telephone station set T18 which assembles these serial bits into commands. Digital telephone station set T18 responds to these commands by performing the indicated operation, such as lighting a lamp, producing an audible ring signal, etc.

If digital telephone station set T18 has no reply or other control message to send back to system processor 100, it transmits idle bits back to port circuit 118. If digital telephone station set T18 has a control message to send to system processor 100, it is written into the control message register of port circuit 118 one bit at a time. Port circuit 118 sets a data-ready bit in its status register (not shown) to indicate to system processor 100 that a control message has arrived from digital telephone station set T18. System processor 100 periodically scans the port circuit status registers via I/O BUS and port data/control circuit 171 for a set data-ready bit. When one is found in port circuit 118, system processor 100 reads the control message stored in the control message register of port circuit 118 and resets the data-ready bit in the status register.

Digital Terminals

Figure 2:
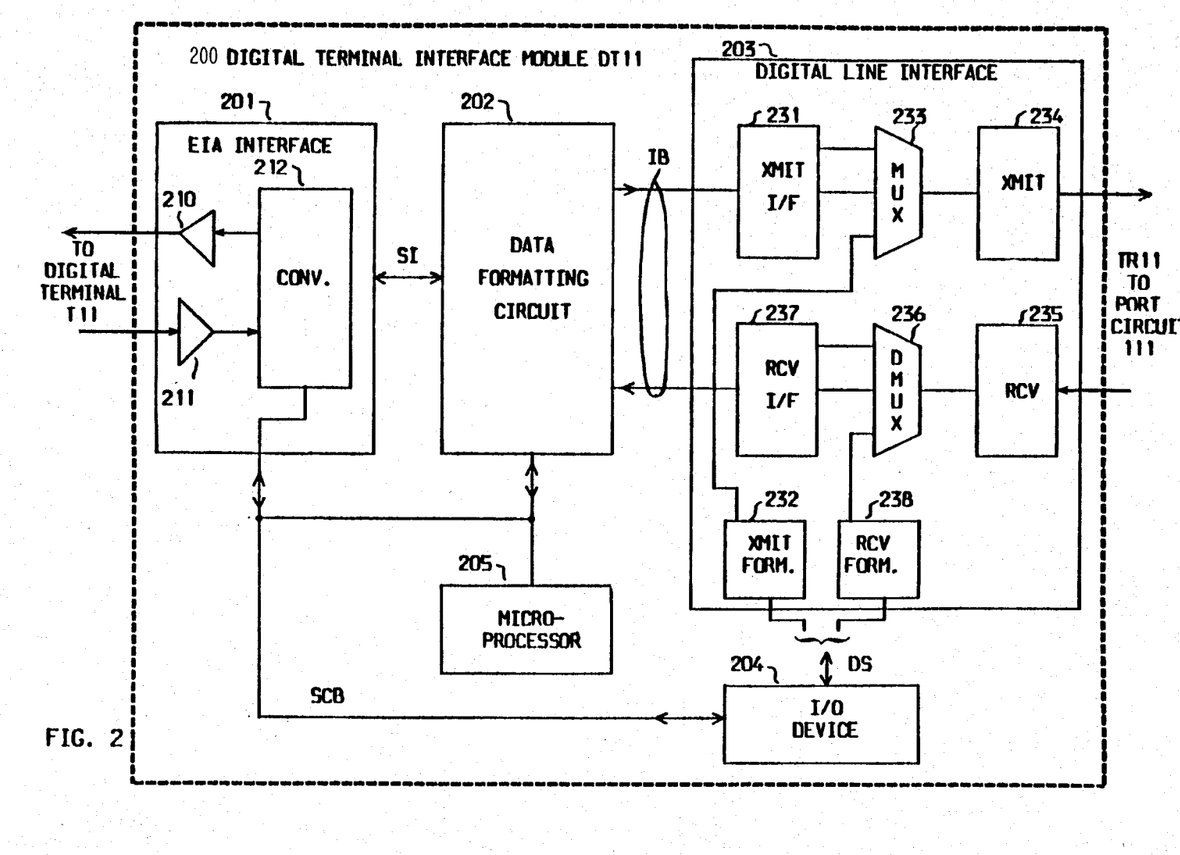
FIG. 2 illustrates the digital terminal interface module.

In this system, the interfacing of digital terminals (such as T11) with the communication leads (TR11) is accomplished by an associated digital terminal interface module (DT11) as shown in FIG. 2, element 200. This also enables the digital terminal to be located remotely from the telephone switching system.

The standard digital terminal keyboard has an RS232 signal output which has a very limited transmission range. A digital terminal interface module is used to convert the RS232 signals to alternate bipolar modulated code signals which can be transmitted a significant distance over a communication pair to the telephone switching system. The digital terminal interface module is either an integral part of the digital terminal (the situation assumed for this disclosure) or connected between the existing digital terminal and the associated communication pair.

Message Format—FIG. 8

A particular message frame format is used by DTIM DT11 200 to enable data transmission between port circuits such as 111 and their associated digital terminals such as T11. This message frame format is also used by digital telephone station set T18 to enable data transmission to port circuit 118. This format consists of a framing bit and three fields: an S field that conveys control signalling data, and two I fields that convey information data (FIG. 8). This is a well-known data transmission format as described in the article by N. Accarino et al entitled, "Frame-Mode Customer Access to Local Integrated Voice and Data Digital Networks" published in 1979 in the Conference Report of the IEEE 1979 International Conference on Communications. In this data transmission format, one of the I fields can be used for the transmission of PCM-encoded voice information while the other one (or both I fields) can be used for the transmission of either bulk or interactive data.

Digital Terminal Interface Module—FIG. 2

Digital terminal interface module DT11 200 (illustrated in FIG. 2) is a microprocessor controlled circuit which contains a number of interface and protocol conversion devices. Digital terminal T11 generates EIA control signals, ASCII data and timing signals that are converted by EIA interface circuit 201 from RS232 signal levels to 5 volt logic signal levels. EIA interface 201 interconnects with digital terminal T11 to process EIA control, data and timing signals. EIA interface 201 includes line driver 210 and line receiver 211 to handle the transmit and receive functions over the signal leads which connect DTIM DT11 200 with digital terminal T11. Converter 212 provides the control and data storage functions. In particular, converter 212 includes status registers (not shown) to store an indication of the state of the various EIA control leads from digital terminal T11. Converter 212 also includes a FIFO (not shown) which stores serial data bits transmitted by digital terminal T11 to EIA interface 201. When the FIFO in converter 212 contains eight bits, converter 212 sets a message received flag in a message received status register.

Microprocessor 205 periodically scans all the status registers in EIA interface 201 via bus SCB to determine whether there are any changes in the status of digital terminal T11. When a status register indicates a change in the state of an EIA control lead, microprocessor 205 reads the changed state out of the status register and generates a control message for system processor 100. Microprocessor 205 writes this control message via bus SCB into I/O 204 which is an Intel 8243 I/O latch circuit. Similarly, when microprocessor 205 detects a set message received flag during a scan, it signals EIA interface 201 to output the received eight bit data message in parallel over leads SI to data formatting circuit 202.

Data formatting circuit 202 generates idle flags when no data is being received from digital terminal T11. These idle flags are periodically read by digital line interface 203 and transmitted to switching network 101 via the I channel (port circuit 111, port data/control interface circuit 171). However, once digital terminal T11 begins transmitting a data message, data formatting circuit 202 formats the received data message. This formatting includes generating a header for the data message, bit stuffing and calculating a cyclic redundancy check (CRC) code which is appended to the end of the data message. The formatted data message is stored in eight bit increments in a data message memory (not shown) in data formatting circuit 202.

Digital line interface 203 interconnects DTIM DT11 200 with port circuit 111 via communication leads TR11. Digital line interface 203 includes a control circuit (not shown) and a phase locked loop (not shown) which recover the clock signals from the message frames serially transmitted by port circuit 111 to DTIM DT11 200 via communication leads TR11. These recovered clock signals are used by digital line interface 203 to both receive message frames from port circuit 111 and generate message frames for serial transmission to port circuit 111.

Transmit interface 231 reads out eight bits at a time of the formatted data message stored in the data message memory of data formatting circuit 202. Similarly, transmit formatter 232 reads one bit at a time of the control message stored by microprocessor 205 in I/O 204. Multiplexer 233 combines two eight bit data messages from transmit interface 231 with the one bit control message from transmit formatter 232 to create the message frame of FIG. 8. The resultant message frame is transmitted in serial form by transmitter 234 to port circuit 111 via communication leads TR11.

Message frames transmitted to DTIM DT11 200 by port circuit 111 are received and decoded in reciprocal fashion by DTIM DT11 200. Receiver 235 receives message frames serially transmitted by port circuit 111 on communication leads TR11. Demultiplexor 236 takes the received message frame from receiver 235 and switches the two eight bit data messages to receive interface 237 and the one bit control message to receive formatter 238. Receive formatter 238 stores the control bit in I/O 204 via lead DS. Microprocessor 205 reads the received control message from I/O 204 in eight bit increments and interprets the same. If the control message requires that digital terminal T11 be signalled, microprocessor 205 loads the corresponding status registers in EIA interface 201 so that these signals will be forwarded to digital terminal T11. Similarly, data formatter 202 reads the two eight bit data messages from receive interface 237 and transmits the same to digital terminal T11 via EIA interface 201. Data formatter 202 calculates a CRC code on the received data message to insure accuracy of transmission.

Data Call Transfer

To illustrate the operation of data call transfer in this system, assume that a calling party at digital telephone station set T18 initiates a data call to communications circuit T58, which is assumed to be a data module (computer port) set to automatic answer. When the calling party is connected to the called terminal, the calling party at digital telephone station set T18 then transfers the call to digital terminal T11 which is equipped with a keyboard and a CRT.

In particular, the calling party goes off-hook at digital telephone station set T18. Digital telephone station set T18 responds to the off-hook condition by transmitting a control message to system processor 100 via the S channel (port circuit 118, port data/control interface circuit 171, I/O BUS) requesting dial tone. System processor 100 responds to this control message by connecting telephone station set T18 via the I channel (port circuit 18, port data/control interface circuit 171) and switching network 101 to an idle digit register which is connected to switching network 101 and which supplies dial tone to the calling party.

Call Dialing

The digit register circuit provides a PCM encoded dial tone to digital telephone station set T18 over the I channel in response to the network connection to digital telephone station set T18. The calling party at digital telephone station set T18 receives the dial tone thus issued and dials the station number of data module T58. The dial pulses or tones so generated are encoded into eight bit PCM samples by digital telephone station set T18 and transmitted via the I channel and switching network 101 to the digit register circuit in the manner outlined above. When the calling party completes dialing, system processor 100 reads out the dialed number from the digit register circuit via I/O BUS and decodes the dialed number to identify the called station, data module T58. System processor 100 activates switching network 101 to establish a network connection between port circuit 118 and port circuit 158. System processor 100 then signals data module T58 by transmitting a ringing control message via I/O BUS and port data/control interface circuit 175 to port circuit 158. Port circuit 158 responds to the ringing control message by applying an alerting signal to data module T58 via communication leads TR58.

Transfer After Called Party Answers

As we assumed for this example, data module T58 automatically goes off-hook in response to the alerting signal. Data module T58 is thereby connected to telephone station set T18 via the switching network time slot assigned to this network connection.

When these circuit interactions are completed, communications circuits T18 and T58 are connected via port circuit 118, port data/control interface circuit 171, switching network 101, port data/control interface circuit 175 and port circuit 158. At this point, to effect data call transfer from telephone station set T18 (used to initiate the call) to digital terminal T11, the calling party presses the DATA button on telephone station set T18 that corresponds to the selected digital terminal T11. Digital telephone station set T18 responds to the DATA button operation by transmitting a control message indicating the DATA button operation via the S channel to system processor 100.

Routine DMRTN4

System processor 100 enters routine DMRTN4 at terminal 301 (shown on FIG. 3) in response to the DATA button control message. System processor 100 associates the line number of the line that sent the DATA stimulus, that of telephone station set T18, with pointer FAC1 at step 302.

Figure 3:
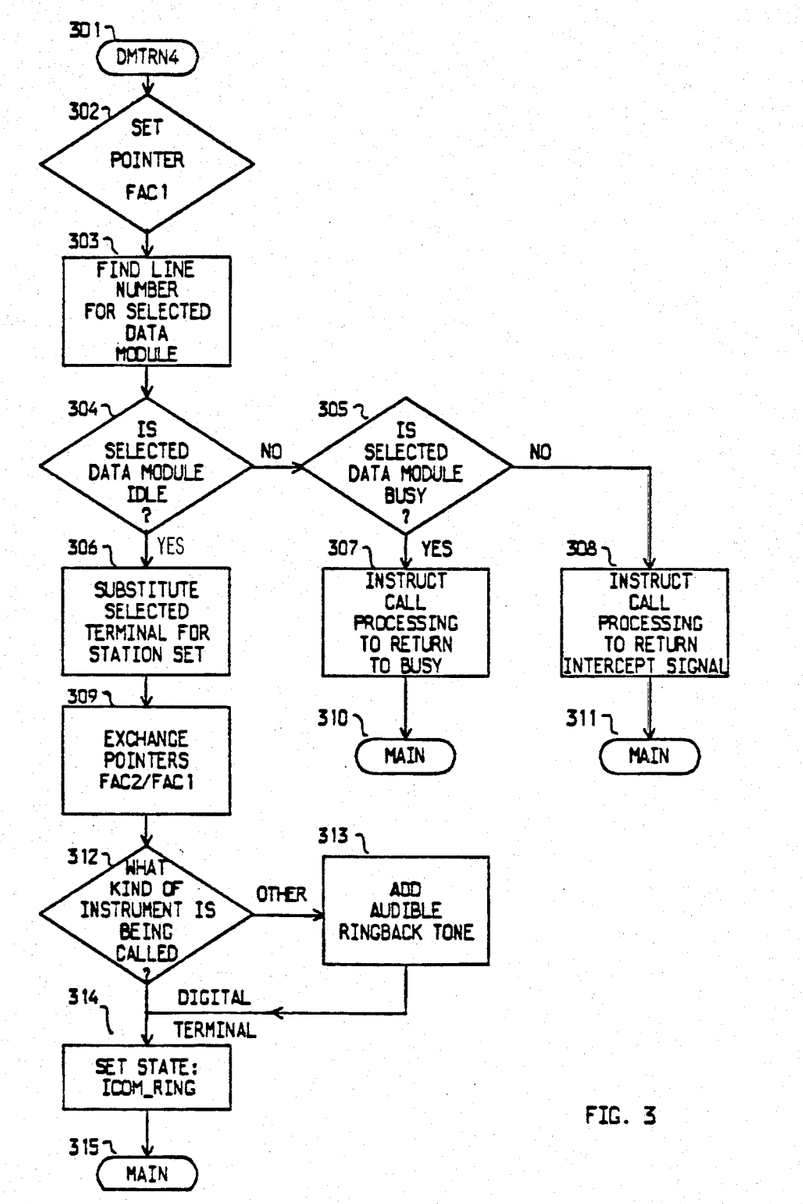
FIGS. 3–7 illustrate the method used to transfer a data call from a calling telephone station set to a digital terminal.

System processor 100 at step 303 finds the line number (in a memory table maintained for the purpose) of the digital terminal T11 that corresponds to the operated DATA button. System processor 100 determines at step 305 whether the line for selected digital terminal T11 is idle. If the line for digital terminal T11 is busy, system processor 100 directs switching network 101 to connect a busy signal trunk (not shown) to the calling party at telephone station set T18 and system processor 100 exits to conventional call processing at step 310. If the line for digital terminal T11 is otherwise unavailable, an intercept signal is returned to the calling party at digital telephone station set T18 and the call exits to conventional call processing at step 311.

In the given example, the line for selected digital terminal T11 is idle. System processor 100 at step 309 exchanges digital telephone station set T18 and selected digital terminal T11 on the active call appearance. Thus digital telephone station set T18 is disconnected from the call and digital terminal T11 is connected to data module T58. Telephone station set T18 is still off-hook and therefore receives dial tone at this point. Digital terminal T11 is still "on-hook," so it must be stimulated in the conventional way to answer.

In conventional call processing, system processor 100 treats the line associated with pointer FAC2 as the called station and will ring or otherwise signal the called line. However, the subject digital terminal T11 is associated with pointer FAC1 as a result of step 302. System processor 100 at step 309 exchanges pointers so that the line assigned to digital terminal T11 is associated with pointer FAC2 and the line assigned to data module T58 is associated with pointer FAC1.

At step 312, system processor 100 retrieves from a table maintained for the purpose, data that indicate what kind of instrument is associated with the called line. On some occasions, the instrument may be other than a digital terminal: for instance a telephone station set. In these cases, an audible ringback tone is returned to the calling part at step 313 to indicate that the called line is being rung. But the instrument called in the current example is a digital terminal (T11), so step 313 is bypassed at step 312 and ringback tone is not sent. Finally, system processor 100 at step 314 sets state ICOM_RING for the call processing subroutine to complete the call in the conventional way.

Transfer Before Called Party Answers

For purposes of illustration consider now a call similar to the above where transfer or the call from telephone station set T18 to digital terminal T11 is initiated at calling telephone station set T18 before the called data module T58 answers. As in the previous example, the calling party dials the station number of data module T58. The calling party then presses the DATA button (on telephone station set T18) that corresponds to digital terminal T11 before data module T58 answers. Since calling telephone station set T18 is ringing called data module T58, system processor 100 sets state ICOM_RING When a DATA button is pressed in the presence of the ICOM_RING state, routine DMRTN5 is called.

Routine DMRTN5

Figure 4:
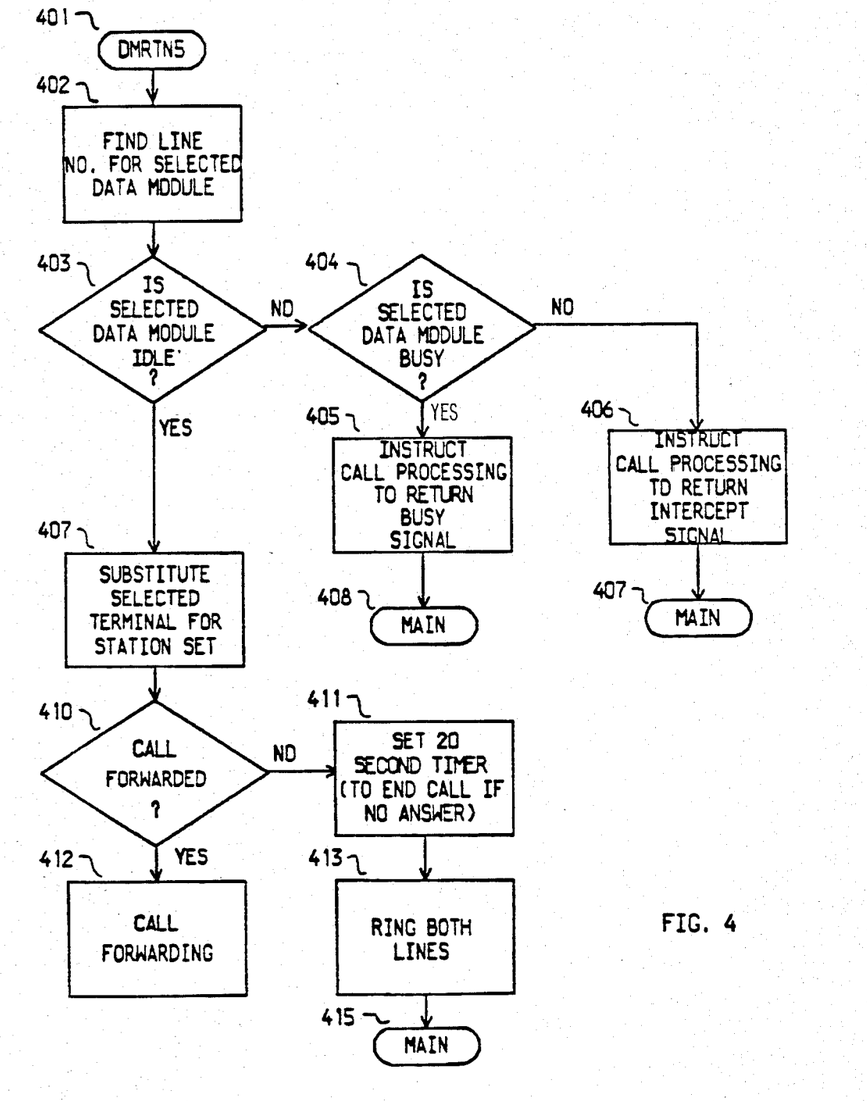

System processor 100 enters routine DMRTN5 at terminal 401 (see FIG. 4). At step 402 system processor 100 finds the line number, in a table maintained for the purpose, of the digital terminal (T11) that corresponds to the DATA button pressed. System processor 100 determines at step 403 whether the line for selected digital terminal T11 is idle. If the line is busy, system processor 100 returns a busy signal to the calling party at step 405 and system processor 100 exits to conventional call processing at terminal 408. If selected digital terminal T11 is otherwise unavailable, an intercept signal is returned to the calling party at telephone station set T18 (step 406) and system processor 100 exits to conventional call processing at terminal 409.

In the current example, the line for selected digital terminal T11 is idle so system processor 100 proceeds to step 407 and exchanges telephone station set T18 and selected digital terminal T11 on the active call appearance. Thus telephone station set T18 is disconnected from the call and digital terminal T11 is connected to data module T58. Telephone station set T18, is still off-hook and therefore, receives a dial tone at this point.

At step 410, system processor 100 determines whether the current call is a forwarded call. This is accomplished by reading the current call state out of a table maintained for that purpose in system processor 100 memory. If this call is forwarded, system processor 100 branches to the call forwarding (step 412) routine of call processing. The call in the current example is not forwarded so system processor 100 proceeds to step 411.

At this point, neither calling digital terminal T11 nor called data module T58 is "off-hook". System processor 100 sets a 20 second timer at step 411 to end the call if neither called data module T58 nor calling digital terminal T11 answers. Since the call is not under human control, system processor 100 ensures that machine resources are not used for an unreasonable length of time ringing two pieces of equipment that are not capable of answering. System processor 100 sets state RING_RING at step 413 so conventional call processing will call both pieces of equipment. If neither digital terminal T11 nor data module T58 answers before the timer completes its cycle system processor 100 dismantles the call. The system is then returned to conventional call processing at terminal 415.

Routine DMRTN1

Assume that one of the communications circuits went "off-hook" and was connected to a switching network time slot by conventional call processing. System processor 100 enters routine DMRTN1 at terminal 501 shown on FIG. 5. A record is kept in registers of system processor 100 of the state of the various lines in the PBX, and the records of the two subject lines are accessed by means of pointers FAC1 and FAC2.

Figure 5:
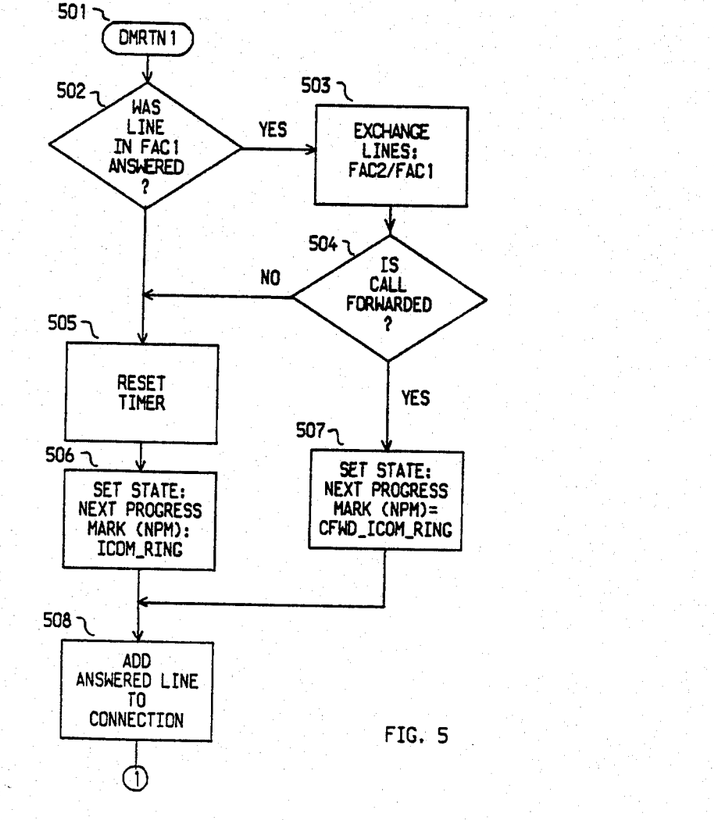

The communications circuit that went off-hook is tested at decision 502 to find if it is associated with pointer FAC2. If it is, then system processor 100 at step 503 exchanges the pointers for the called and calling parties. In either event, the line that has been answered is associated with pointer FAC2 after decision 502. If the status of the called and calling parties was exchanged by step 503, then system processor 100 at step 504 determines from its call status tables whether this call is forwarded. If call forward has been set, system processor 100 at step 507 sets the next progress mark (NPM) to CFWD_ICOM_RING. If call forward has not been set, the timer set in step 505 is reset and the next progress mark (NPM) is set to ICOM_RING.

Figure 6:
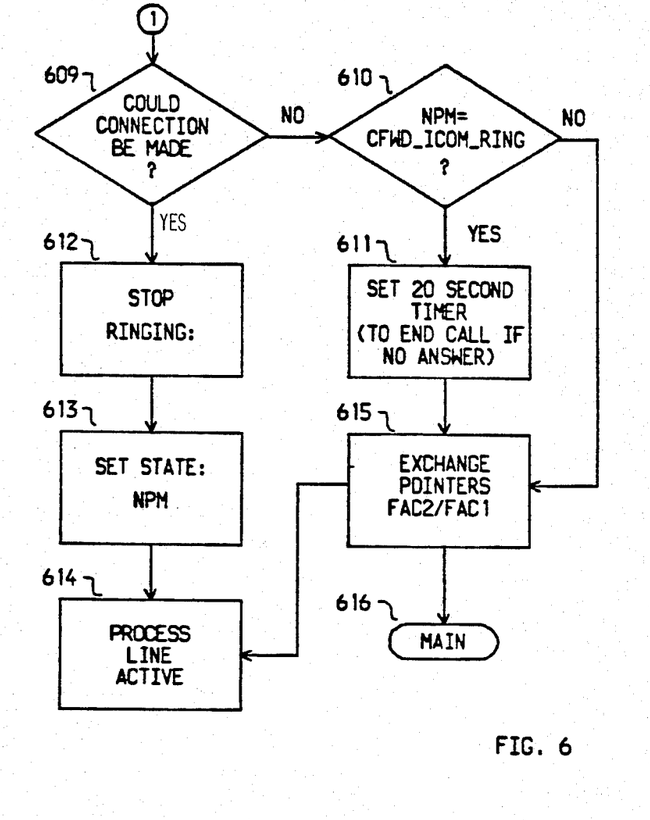

System processor 100 now attempts to add the answered line to the connection at step 508. If a connection can not be made, system processor 100 is directed at step 609 to step 610 where system processor 100 determines whether call forwarding is in effect. If call forwarding is in effect on the station that answered, pointers are switched between the two subject lines at step 615. The unanswered station is assigned to pointer FAC2 (the one that indicates the called station to call processing) and the call is returned to call processing at terminal 616 in its original state (that is, CFWD_RING_RING) so an attempt can be made to connect the station that did not answer. If call forwarding is not in effect on the station that answered, step 611 sets a 20 second timer to end the call if neither called data module T58 nor calling digital terminal T11 answers. Since the call is not under human control, the process must ensure that machine resources are not used for an unreasonable length of time ringing two data modules that are not capable of answering. The call is then returned to call processing at terminal 616 in its original state (that is, RING_RING) so another attempt can be made to complete the call within the 20-second limit. If the call is not so completed, it is dismantled by routine DMRTN3 as described above.

If a connection could be made, system processor 100 at step 612 stops ringing the line that answered. System processor 100 at step 613 sets either the ICOM_RING or CFWD_ICOM_RING state, depending on the entry state to routine DMRTN1 and makes the conventional changes to trunk tables, etc. so that the connected line has an active status. Finally, the system processor 100 assigns pointer FAC2, the pointer associated with the called party, to the unanswered station so the call is returned to call processing at terminal 616 appearing to be a call from the answered station to the unanswered station. The call processing subroutine then completes this call in the conventional way.

Transfer by Called Party

For purposes of illustation consider a call from a calling station (telephone station set T18) to another telephone station set (T51). The parties to the call both agree to transfer the call to terminals or facsimile machines associated with the respective telephone station sets.

With an existing call, the two stations are connected and state TALK_ICOM will have been set. At this point, to effect a transfer from the telephone station set used to initiate the call (T18) to a digital terminal (T11), the party at telephone station set T18 presses the DATA button on telephone station set T11 that corresponds to the subject digital terminal (T11). When a DATA button is pressed in the presence of the TALK_ICOM state, system processor 100 calls routine DMRTN4.

Routine DMRTN4

Routine DMRTN4 is entered at terminal 301 shown on FIG. 3. A record is kept of the state of the various active lines in the PBX, and the records of the two subject lines are accessed by means of pointers FAC1 and FAC2, step 303. The record of the line that sent the DATA stimulus, that of telephone station set T18 is associated with pointer FAC1.

System processor 100 at step 304 finds the line number in a table maintained for the purpose of the digital terminal T11 that corresponds to the DATA button pressed on telephone station set T18. This line number is then used as data at decision 305, where system processor 100 determines whether the line for digital terminal T11 is idle. If the line is busy, a busy signal is returned to the calling party, step 307, and system processor 100 exits at terminal 310 to conventional call processing. If the line is otherwise unavailable, an intercept signal is returned to the calling party, step 308, and system processor 100 exits at terminal 312 to conventional call processing. But the line for selected digital terminal T11 is idle in the current example, so system processor 100 increments the program to step 306 where telephone station set T18 and selected digital terminal T11 are substituted for one another on the active call appearance. Thus, telephone station set T18 is disconnected from the call and digital terminal T11 is connected. Telephone station set T18 is still off-hook and therefore receives a dial tone at this point. Digital terminal T11 is still "on-hook" stimulated in the conventional way to answer.

In conventional call processing, system processor 100 treats the line associated with pointer FAC2 as the called party and will ring or otherwise signal the called line. System processor 100 at step 309 exchanges pointers so that the line assigned to digital terminal T11 is associated with pointer FAC2 and the line assigned to telephone station set T51 is associated with pointer FAC1.

At decision 312, system processor 100 retrieves from a table maintained for the purpose, data that indicate what kind of instrument is currently assigned to telephone station set T51. In this case the instrument is a voice instrument. An audible ringback tone is therefore returned to the calling party at step 313 to indicate that the other line is being rung. If the instrument called in the current example were a data module, step 313 would be bypassed at decision 312 and a ringback tone would not have been sent. Finally, step 314 sets state ICOM_RING to be used by ordinary call processing to complete the call in the conventional way, step 315.

Assume that this portion of the call transfer is indeed completed. One line of the call is connected to digital terminal T11, and the other to telephone station set T51 and system processor 100 set the TALK_ICOM state. Finally, as agreed, the other party to the call presses a DATA button on telephone station set T51 corresponding to data module T58. When a DATA button is pressed in the presence of the TALK_ICOM state, system processor 100 branches to routine DMRTN4. So the call transfer is completed by system processor 100 using routine DMRTN4 as already described.

Return To Voice From A Data Call

The next example concerns the transfer back to voice of a data call such as the one just described. The purposes of the preceding call having been fulfilled, the parties to the call return the call to their telephone station sets to confirm the success of the call by discussion. To return to voice, a party to the call simply takes a telephone station set off-hook and presses the DATA button assigned to the active data module.

As the process begins, telephone station set T18, for example, is receiving a dial tone sent via the I channel by the circuit interactions described above, and the PBX is awaiting the first digit to be dialed. Thus, the FIRST_DIGIT_DIAL state is set in system processor 100, but the stimulus rather than a dailed digit is that of the pressed DATA button. When the DATA button is pressed in the presence of the FIRST_DIGIT_DIAL state, routine DMRTN2 is executed.

Routine DMRTN2

Figure 7:
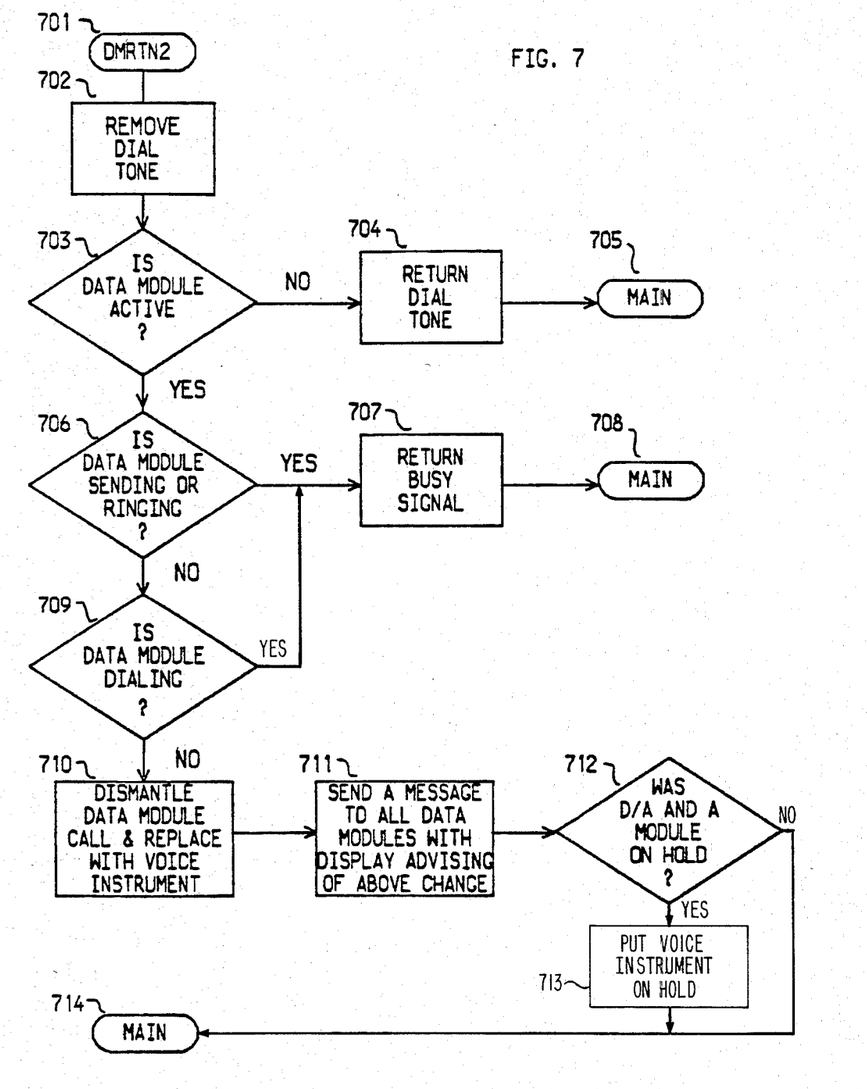

Routine DMRTN2 is entered at terminal 701 shown on FIG. 7. System processor 100 at step 702 removes the dial tone from the voice instrument so the user may know that the DATA button activation was received.

At decision 703, system processor 100 determines from line records stored for the purpose, whether the line for selected digital terminal T11 is active. If the line is not active, there is no connection to return to voice. System processor 100 returns dial tone at step 704 to the user at telephone station set T18, and routine DMRTN2 exits to conventional call processing at terminal 705. If the line for digital terminal T11 is active, routine DMRTN2 continues to decision 706.

System processor 100 determines at decision 706 if digital terminal T11 is in sending or ringing mode. If it is in neither, a busy signal is returned by system processor 100 at step 707 to telephone station set T18, and routine DMRTN2 exits to conventional call processing at terminal 708. If digital terminal T18 is in either sending or ringing mode, routine DMRTN2 continues to decision 709 where a state record is checked to find if digital terminal device T11 is dialing. If so, system processor 100 at step 707 causes switching network 100 to connect a busy tone trunk to telephone station set T18, and routine DMRTN2 exits to conventional call processing at terminal 708. If digital terminal T11 is not dialing, routine DMRTN2 continues to step 710.

System processor 100 at step 710 removes all traces of the call that relate to digital terminal T11 (stored states, line numbers, etc.) and replaces them with data creating a call to telephone station set T18. Since telephone station set T18 rather than digital terminal T11 is now connected to the call, a message to this effect is sent by system processor 100 at step 711 to all other stations that are party to the call (in this case, data module T58).

Finally, the hold status of data module T58 is transferred to telephone station set T51 at decision 712. That is, if data module T58 was on hold, telephone station set T51 is put on hold by step 713. Then routine DMRTN2 exits at terminal 714 to conventional call processing. A similar call transfer is then effected by the user at telephone station set T51 and the two users are again returned to a voice connection.

While a specific embodiment of the invention has been disclosed, variations in structural detail, within the scope of the appended claims, are possible and are contemplated. There is no intention of limitation to what is contained in the abstract or the exact disclosure as herein presented. The above-described arrangements are only illustrative of the application of the principles of the invention. Normally, other arrangements may be devised by those skilled in the art without departing from the spirit and the scope of the invention.

What is claimed is:

1. In a switching system which serves a plurality of communications circuits (T11-T58), each of which is connected by an associated port circuit (111-158) to a switching network (101) of said switching system, which switching network (101) establishes communications connections among said communications circuits (T11-T58) by interconnecting said associated port circuits (111-158), wherein one or more of said communications circuits (T18) are telephone station sets, each of which has associated therewith one or more of said communications circuits which are digital terminals (T11), said association including a designated button on said telephone station set (T18) corresponding to each of said digital terminals (T11) associated with said telephone station set (T18), a data call transfer method comprising the steps of:

storing dialing signals output by any one of said telephone station sets (T18) in response to an initiation of a call at said telephone station set (T18); and establishing in response to an operation of one of said designated buttons on said telephone station set (T18) a network connection between the one of said digital terminals (T11) associated with said operated designated button and a destination (T58) indicated by said dialing signals.

2. The method of claim 1 wherein the step of establishing includes the step of:

returning said one telephone station set (T18) to an idle condition.

3. The method of claim 1 wherein the step of establishing includes the steps of:

timing said one telephone station set (T18) following the storing of said dialing signals for a predetermined interval; and completing a network connection between said telephone station set (T18) and the destination indicated by said dialing signals (T58) at the end of said predetermined interval if the calling party does not operate one of said designated buttons on said telephone station set (T18) during said predetermined interval.

4. The method of claim 2 including the steps of:

scanning said telephone station set (T18) for the operation of one of said designated buttons on said telephone station set (T18) in response to an initiation of a subsequent call at said telephone station set (T18); and substituting said telephone station set (T18) for said digital terminal (T11) on said network connection in response to the operation of the one of said designated buttons associated with said digital terminal (T11).

5. The method of claim 4 wherein the step of substituting includes the step of:

returning said digital terminal (T11) to an idle condition.

6. In a switching system which serves a plurality of communications circuits (T11-T58), each of which is connected by an associated port circuit (111-158) to a switching network (101) of said switching system, which switching network (101) establishes communications connections among said communications circuits (T11-T58) by interconncting said associated port circuits (111-158), wherein one or more of said communications circuits (T18) are telephone station sets, each of which has associated therewith one or more of said communications circuits which are digital terminals (T11), said association including a designated button on said telephone station set (T18) corresponding to each of said digital terminals (T11) associated with said telephone station set (T18), a data call transfer method comprising the steps of:

storing dialing signals output by any one of said telephone station sets (T18) in response to an initiation of a call at said telephone station set (T18);

establishing a network connection between said telephone station set (T18) and a destination (T58) indicated by said dialing signals; and substituting in response to an operation of one of said designated buttons on said telephone station set (T18) the one of said digital terminals (T11) associated with said operated designated button for said telephone station set (T18) on said network connection.

7. The method of claim 6 wherein the step of substituting includes the step of:

returning said telephone station set (T18) to an idle condition.

8. The method of claim 7 including the steps of:

scanning said telephone station set (T18) for the operation of one of said designated buttons in response to an initiation of a subsequent call at said telephone station set (T18); and exchanging said telephone station set (T18) for said digital terminal (T11) on said network connection in response to the operation of the one of said designated buttons associated with said digital terminal (T11).

9. The method of claim 8 wherein the step of exchanging includes the step of:

returning said digital terminal (T11) to an idle condition.

10. The method of claims 1 or 6, wherein said destination T58 is a second telephone station set, including the steps of:

scanning said second telephone station set (T58) for an operation of one of said designated buttons on said second telephone station set (T58) in response to an off-hook condition at said second telephone station set (T58); and interchanging, in response to the operation of one of said designated buttons at said second telephone station set (T58) the one of said digital terminals (T51) associated with said operated designated button at said second telephone station set (T58) for said second telephone station set (T58) on said network connection.

11. The method of claim 10 wherein the step of interchanging includes the step of:

returning said second telephone station set (T58) to an idle condition.

12. The method of claim 11 including the steps of:

scanning said telephone station set (T18) for the operation of one of said designated buttons in response to an initiation of a subsequent call at said telephone station set (T18); and exchanging in response to the operation of one of said designated buttons on said telephone station set (T18), said telephone station set (T18) for the one of said digital terminals (T11) associated with said operated designated button on said network connection.

13. The method of claim 12 wherein the step of substituting includes the step of:

returning said terminal device (T11) to an idle condition.

14. The method of claim 11 including the steps of:

testing said second telephone station set (T58) for an operation of one of said designated buttons on said second telephone station set (T58) in response to an initiation of a subsequent call at said second telephone station set (T58); and substituting, in response to the operation of one of said designated buttons at said second telephone station set (T58), said second telephone station set (T58) for the one of said digital terminals (T51) associated with said operated designated button on said second telephone station set (T58) on said network connection.

15. The method of claim 14 wherein the step of substituting includes the step of:

returning said digital terminal (T51) to an idle condition.

16. In a switching system which serves a plurality of communications circuits (T11-T58), each of which is connected by an associated port circuit (111-158) to a switching network (101) of said switching system, which switching network (101) establishes network connections among said communications circuits (T11-T58) by interconnecting said associated port circuits (111-158), wherein one or more of said communications circuits (T18) are telephone station sets, each of which has associated therewith one or more of said communications circuits which are digital terminals (T11), said association including a designated button on said telephone station set (T18) corresponding to each of said digital terminals (T11) associated with said telephone station set (T18), a data call transfer method comprising the steps of:

storing dialing signals output by any one of said telephone station sets (T18) in response to an initiation of a call at said telephone station set (T18);

establishing a network connection between said telephone station set (T18) and a second telephone station set (T58) identified by said dialing signals; and substituting in response to an operation of one of said designated buttons on said second telephone station set (T58) the one of said digital terminals (T51) associated with said operated designated button for said second telephone station set (T58) on said network connection.

17. In a switching system which serves a plurality of communications circuits (T11-T58), each of which is connected by an associated port circuit (111-158) to a switching network (101) of said switching system, which switching network (101) establishes network connections among said communications circuits (T11-T58) by interconnecting said associated port circuits (111-158), wherein one or more of said communications circuits (T18) are telephone station sets, each of which has associated therewith one or more of said communications circuits which are digital terminals (T11), a data call transfer arrangement comprising:

one or more designated button means on each of said telephone station sets (T18) which designated button means correspond to one of said associated digital terminals (T11);

system processor means (100) connected to said switching network (101) and responsive to dialing signals output by one of said telephone station sets (T18) on a call initiation for storing said dialing signals;

control signalling means (S channel) connected to and interconnecting said telephone station set (T18) and said system processor (100) and responsive to the operation of one of said designated button means on said telephone station set (T18) for transmitting a call transfer signal indicative of said designated button operation to said system processor (100); and means in said system processor means (100) responsive to said call transfer signal for activating said switching network to connect said one of said digital terminals (T11) associated with said operated designated button means to the destination indicated by said dialing signals.

18. In a switching system which serves a plurality of network circuits (T11-T58), each of which is connected by an associated port circuit (111-158) to a switching network (101) of said switching system, which switching network (101) establishes network connections among said communications circuits (T11-T58) by interconnecting said associated port circuits (111-158), wherein one or more of said communications circuits are telephone station sets (T18), each of which has associated therewith one or more of said communications circuits which are digital terminals (T11), a data call transfer arrangement comprising:

system processor means (100) connected to said said switching network (101) and responsive to dialing signals output by any one of said telephone station sets (T18) on a call initiation for activating said switching network (101) to connect said telephone station set (T18) to the destination (T58) indicated by said dialing signals;

one or more button means on each of said telephone station sets (T18) corresponding on a one to one basis to said one or more associated digital terminals (T11);

control signalling means (S channel) connected to and interconnecting said telephone station set (T18) and said system processor (100) and responsive to the operation of one of said designated button means on said telephone station set (T18) for transmitting a call transfer signal indicative of said designated button operation to said system processor (100); and wherein said system processor means (100) is responsive to said call transfer signal for activating said switching network (101) to connect one of said digital terminals (T11) associated with said one button means to said destination (T58) in place of said telephone station set (T18).

* * * * *